(12) United States Patent
Park et al.

(10) Patent No.: US 7,167,783 B2
(45) Date of Patent: Jan. 23, 2007

(54) APPARATUS AND METHOD FOR CONTROLLING REGENERATIVE BRAKING OF AN ELECTRIC VEHICLE

(75) Inventors: Jin Ho Park, Seoul (KR); Hyun Soo Kim, Gunpo (KR); Hoon Yeo, Suwon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 342 days.

(21) Appl. No.: 10/911,721

(22) Filed: Aug. 4, 2004

(65) Prior Publication Data

US 2005/0143878 A1    Jun. 30, 2005

(30) Foreign Application Priority Data

Dec. 30, 2003    (KR)    ...................... 10-2003-0100907

(51) Int. Cl.
 B60W 20/00    (2006.01)
 B60T 8/64    (2006.01)
 G06F 7/00    (2006.01)

(52) U.S. Cl. ............................ 701/22; 701/70; 701/78; 303/152

(58) Field of Classification Search .................. 701/22, 701/70, 69, 78, 81, 89; 303/152, 3, 113.2; 188/156, 158; 477/182
See application file for complete search history.

(56) References Cited

U.S. PATENT DOCUMENTS

| 4,962,969 | A | * | 10/1990 | Davis | ............................. 303/3 |
| 5,476,310 | A | * | 12/1995 | Ohtsu et al. | .................... 303/3 |
| 5,615,933 | A | * | 4/1997 | Kidston et al. | ............. 303/152 |
| 6,449,552 | B1 | * | 9/2002 | Ohba et al. | .................... 701/89 |

FOREIGN PATENT DOCUMENTS

JP    2002-095108    3/2002

* cited by examiner

*Primary Examiner*—Tan Nguyen
(74) *Attorney, Agent, or Firm*—Morgan Lewis & Bockius LLP

(57) ABSTRACT

The method includes detecting a brake pedal operation. Thereafter, calculating a non-driven wheel braking force applied to a non-driven wheel of the electric vehicle according to the brake pedal operation. Subsequently, calculating a target braking force for a driven wheel corresponding to the non-driven wheel braking force. Then, calculating an available regenerative braking force for the driven wheel. The method then compares the target braking force and the available regenerative braking force for the driven wheel. The method also controls regenerative braking and hydraulic braking of the driven wheel on the basis of the comparison of the target braking force and the available regenerative braking force for the driven wheel.

34 Claims, 9 Drawing Sheets

State of charge (SOC) of battery

Vehicle speed

APPARATUS AND METHOD FOR CONTROLLING REGENERATIVE BRAKING OF AN ELECTRIC VEHICLE

CROSS-REFERENCE TO RELATED APPLICATIONS

This application claims priority of Korean Application No. 10,2003-0100907, filed Dec. 30, 2003, the disclosure of which is incorporated herein by reference.

FIELD OF THE INVENTION

Generally, the present invention relates to an electric vehicle. More particularly, the present invention relates to a method and apparatus for controlling regenerative braking of an electric vehicle.

BACKGROUND OF THE INVENTION

Instead of a conventional internal combustion engine (hereinafter referred to as an engine), an alternative power source is under investigation to be used as a power source of a vehicle in order to reduce environment pollution caused by exhaust gas of the vehicle and to prepare for a shortage of limited petroleum resources.

An electric vehicle is a typical example thereof. An electric vehicle runs a motor using electric energy stored in a battery, and uses a driving force of the motor as an entire or partial power source of the vehicle. Such an electric vehicle may be generally divided into a pure electric vehicle that uses only electric energy of a battery as a power source, and a hybrid electric vehicle (HEV) that is equipped with an internal combustion engine such that the power of the engine may be used for charging the battery and/or driving the vehicle.

In a narrow definition, the term "electric vehicle" may means only a pure electric vehicle for differentiation from the term "hybrid electric vehicle". However, the term "electric vehicle" in the present specification is used in a broad definition and includes both the pure electric vehicle and hybrid electric vehicles. More specifically, the term "electric vehicle" in the present specification means any vehicle that has at least one battery, and electric energy stored in the battery is used as a driving force of the vehicle.

Regarding such an electric vehicle, research for converting part of a braking force to electric energy and using such obtained electric energy for charging a battery is under investigation. That is, during braking, part of the kinetic energy associated with the speed of the vehicle is used for driving a generator such that both a reduction of kinetic energy (i.e., a reduction of vehicle speed) and generation of electric energy are realized at the same time. Such a method for braking a vehicle is called regenerative braking. During regenerative braking, electric energy may be generated by driving a motor in reverse or driving a separate generator. Such regenerative braking of an electric vehicle may enhance the fuel mileage of the electric vehicle. In the case of a hybrid electric vehicle, production of noxious exhaust gasses may be reduced in addition to enhancing of fuel mileage.

An electric vehicle is also provided with a hydraulic brake system for braking using hydraulic pressure. Hydraulic brakes are used as regenerative braking is usually insufficient for required deceleration. Hydraulic brakes are also used because the regenerative braking force acts only on driven wheels connected to a motor. Application of braking force only on the driven wheels may negatively impact the vehicle's dynamic control.

According to prior methods/apparatuses for controlling regenerative braking, regenerative braking force is simply added to hydraulic braking force that is mechanically introduced by a brake pedal operated by a driver. In addition, such a regenerative braking force is controlled to have a value that has no relationship to a required total braking force and/or actual hydraulic braking force. Therefore, even if a brake pedal is depressed with a constant pressure, the total braking force of a vehicle may suddenly fluctuate according to whether regenerative braking is triggered or not. Accordingly, a driver may feel confused due to undesired deceleration of the vehicle that has little relationship to brake pedal operation.

In order to reduce such a discrepancy between the brake pedal operation of a driver and the actual deceleration of a vehicle, the regenerative braking force is usually controlled to be lower than an available maximum. Such low control of regenerative braking deteriorates energy reclamation rate thereof.

In addition, according to the prior art, an optimal design for braking force distribution between driven and non-driven wheels was difficult because the regenerative braking force acts only on driven wheels.

The information disclosed in this Background of the Invention section is only for enhancement of understanding of the background of the invention, and should not be taken as an acknowledgement or any form of suggestion that this information forms the prior art that is already known in this country to a person of ordinary skill in the art.

SUMMARY OF THE INVENTION

The present invention provides a method and apparatus for controlling regenerative braking of an electric vehicle, having non-limiting advantages of an achievement of braking force harmonized with a driver's brake operation, an enhancement of energy reclamation efficiency of regenerative braking, and an optimization of braking force distribution between driven and non-driven wheels. Accordingly, the present invention provides a method and an apparatus for controlling regenerative braking of an electric vehicle.

An electric vehicle to which the present invention is applicable includes a battery for storing electric energy, a motor for generating a driving force from the electric energy of the battery, at least one driven wheel driven by the motor, and at least one non-driven wheel that is not driven by the motor. An exemplary apparatus for controlling regenerative braking of such an electric vehicle according to an embodiment of the present invention includes a brake pedal and a first hydraulic module for hydraulically braking the non-driven wheel in response to a brake pedal operation. The apparatus also includes at least one electronic control unit (ECU) for detecting operation of the first hydraulic module and for controlling regenerative braking and hydraulic braking of the driven wheel based thereon, and a second hydraulic module for executing hydraulic braking of the driven wheel under the control of the at least one ECU.

In a further embodiment, the first hydraulic module includes a master cylinder for forming hydraulic pressure in response to the brake pedal operation and a brake pipe for supplying the hydraulic pressure of the master cylinder to the non-driven wheel. The first hydraulic module also includes an auxiliary cylinder connected to at least one of the master cylinder and the brake pipe, for receiving at least part of the hydraulic pressure formed by the master cylinder.

In another further embodiment, the second hydraulic module includes a hydraulic pump for forming a hydraulic pressure under the control of the at least one ECU and an accumulator for storing the hydraulic pressure formed by the hydraulic pump. The second hydraulic module also includes a brake pipe for supplying the hydraulic pressure stored in the accumulator to the driven wheel, and a hydraulic pressure control device for controlling, under the control of the at least one ECU, supply of the hydraulic pressure stored in the accumulator to the brake pipe. In this case, the at least one ECU may execute a set of instructions comprising instructions for detecting the hydraulic pressure of the accumulator, and controlling the hydraulic pump such that the hydraulic pressure of the accumulator stays within a predetermined range. In a further embodiment, the controlling of the hydraulic pump operates the hydraulic pump in the case that the hydraulic pressure of the accumulator is lowered to a first predetermined pressure, and stops an operation of the hydraulic pump in the case that the hydraulic pressure of the accumulator is raised to a second predetermined pressure. The at least one ECU may be realized to execute a set of instructions including instructions for a method for controlling regenerative braking of an electric vehicle according to the present invention that is described below.

An exemplary method for controlling regenerative braking of an electric vehicle having a motor useful with the present invention includes detecting a brake pedal operation. Therefore, calculating a non-driven wheel braking force applied to a non-driven wheel of the electric vehicle according to the brake pedal operation. Subsequently, calculating a target braking force for a driven wheel corresponding to the non-driven wheel braking force, and calculating an available regenerative braking force for the driven wheel. The method compares the target braking force and the available regenerative braking force for the driven wheel, and controls regenerative braking and hydraulic braking of the driven wheel on the basis of the comparison of the target braking force and the available regenerative braking force for the driven wheel.

In a further embodiment, the calculating of the non-driven wheel braking force includes detecting a brake fluid pressure $P_r$ applied to the non-driven wheel by the brake pedal operation, and calculating the non-driven wheel braking force $F_{br}$ on the basis of the brake fluid pressure $P_r$.

In a still further embodiment of the present invention, the non-driven wheel braking force $F_{br}$ is calculated on the basis of the brake fluid pressure $P_r$ as a value of $$F_{br} = \frac{P_r \times (2r_r A_r \mu_{br})}{R_r},$$

wherein $r_r$ denotes an effective radius of a brake disk for the non-driven wheel, $A_r$ denotes an area of a wheel cylinder for the non-driven wheel, $\mu_{br}$ denotes a friction coefficient between the brake disk and the wheel cylinder of the non-driven wheel, and $R_r$ denotes effective radius of a tire on the non-driven wheel.

In another further embodiment of the present invention, the target braking force for the driven wheel is calculated as a value $F_{bf}$ that satisfies $$\frac{F_{bf}}{F_{br}} = \frac{N_f}{N_r},$$

wherein $F_{bf}$ denotes the target braking force for the driven wheel, $F_{br}$ denotes the non-driven wheel braking force, $N_f$ denotes normal force applied to the driven wheel under braking, and $N_r$ denotes a normal force applied to the non-driven wheel under braking.

In more detail, the target braking force for the driven wheel may be calculated as a value $F_{bf}$ that satisfies $$F_{bf} = \frac{a - \frac{2h_g}{mg}F_{br} - \sqrt{a^2 - \frac{4h_g L}{mg}F_{br}}}{\frac{2h_g}{mg}},$$

wherein $F_{br}$ denotes the non-driven wheel braking force, m denotes a mass of the vehicle, g denotes gravitational acceleration, j denotes deceleration of the vehicle, L denotes a wheelbase (distance between front and rear wheels), a denotes a distance from a mass center to the front wheel of the vehicle, b denotes a distance from a mass center to the rear wheel of the vehicle, and $h_g$ denotes a height of the mass center of the vehicle from the ground.

In another further embodiment of the present invention, the calculating of the available regenerative braking force for the driven wheel includes calculating an available maximum regenerative braking torque, calculating an available wheel torque of regenerative braking on the basis of the available maximum regenerative braking torque, and calculating the available regenerative braking force for the driven wheel on the basis of the available wheel torque of regenerative braking.

In this case, the calculating of the available maximum regenerative braking torque may calculate the available maximum regenerative braking torque on the basis of a motor speed ω corresponding to a current vehicle speed of the electric vehicle from a torque characteristic curve of the motor with respect to the motor speed ω.

In more detail, the motor speed ω is calculated as a value $$\omega = \frac{v}{R_f} iN,$$

wherein v denotes the current vehicle speed of the electric vehicle, i denotes a speed ratio of the current shift-speed, N denotes a reduction ratio of a final drive gear, and $R_f$ denotes an effective radius of a tire on the driven wheel.

In another further embodiment of the present invention, the calculating of the available wheel torque of regenerative braking calculates the available wheel torque of regenerative braking as a value $T_{R(wheel)}$ that satisfies $$T_{R(wheel)} = iN \times \frac{T_{R(motor)}}{\eta} \times W,$$

wherein i denotes a speed ratio of the current shift-speed, N denotes a final drive ratio of the transmission, $T_{R(motor)}$ denotes the available motor torque of regenerative braking, η denotes efficiency of the generator, and W denotes a weight value calculated based on at least one parameter of a state of charge (SOC) and the current vehicle speed.

In more detail, the weight value W may be calculated, based on both the state of charge and the current vehicle speed, as a value W=W$_1$(SOC)*W$_2$(v), wherein W$_1$(SOC) denotes a first weight factor calculated based on the state of charge SOC, and W$_2$(v) denotes a second weight factor calculated based on the current vehicle speed v.

In a still further embodiment, the first weight factor W$_1$(SOC) has a first predetermined weight value in the case that the state of charge SOC is below a first predetermined SOC, and otherwise in the case that the state of charge SOC lies in a range from the first predetermined SOC to a second predetermined SOC, the first weight factor has a value that decreases as the SOC increases.

In another further embodiment, the second weight factor W$_2$(v) has a second predetermined weight value in the case that the current vehicle speed v is greater than the second predetermined vehicle speed, and otherwise in the case that the current vehicle speed v lies in a range from a first predetermined vehicle speed to a second predetermined vehicle speed, the second weight factor (W$_2$(v)) has a value that increases as the vehicle speed v increases.

In another further embodiment, the controlling of regenerative braking and hydraulic braking of the driven wheel comprises braking the driven wheel only by regenerative braking in the case that the available regenerative braking force is greater than the target braking force.

In a still further embodiment, the braking of the driven wheel only by regenerative braking controls a generator of the electric vehicle at a generating torque that forms the target braking force.

In a still further embodiment, the braking of the driven wheel only by regenerative braking controls a generator of the electric vehicle at an electricity generating torque T$_{OP}$ that is calculated as a value of $$T_{OP} = \frac{F_{bf} R_f \eta}{iN},$$

wherein F$_{bf}$ denotes the target braking force for the driven wheel, R$_f$ denotes an effective radius of a tire on the driven wheel, η denotes efficiency of the generator, i denotes a speed ratio of the current shift-speed, and N denotes a final drive ratio of the transmission.

In another further embodiment, the controlling of regenerative braking and hydraulic braking of the driven wheel includes, in the case that the target braking force is greater than the available regenerative braking force: regeneratively braking the driven wheel on the basis of the available regenerative braking force, calculating a target hydraulic braking force, and hydraulically braking the driven wheel on the basis of the target hydraulic braking force.

In a still further embodiment, the regeneratively braking of the driven wheel on the basis of the available regenerative braking force controls a generator of the electric vehicle at an electricity generating torque that is calculated as a value of $$T_{OP} = \frac{F_{REGEN} R_f \eta}{iN},$$

wherein F$_{REGEN}$ denotes the available regenerative braking force for the driven wheel, R$_f$ denotes an effective radius of a tire on the driven wheel, η denotes efficiency of the generator, i denotes a speed ratio of the current shift-speed, and N denotes a final drive ratio of the transmission.

In a still further embodiment, the calculating of the target hydraulic braking force calculates the target hydraulic braking force as a difference between the target braking force and the available regenerative braking force.

In a still further embodiment, the hydraulically braking of the driven wheel on the basis of the target hydraulic braking force hydraulically brakes the driven wheel on the basis of a brake fluid pressure P$_f$ that is calculated as a value of $$P_f = \frac{R_f F_{bfFRICTION}}{2r_f A_f \mu_{bf}},$$

wherein R$_f$ denotes an effective radius of a tire on the driven wheel, F$_{bfFRICTION}$ denotes the target hydraulic braking force, r$_f$ denotes an effective radius of a brake disk for the driven wheel, A$_f$ denotes an area of a wheel cylinder for the driven wheel, and μ$_{bf}$ denotes a friction coefficient between the brake disk and the wheel cylinder of the driven wheel.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
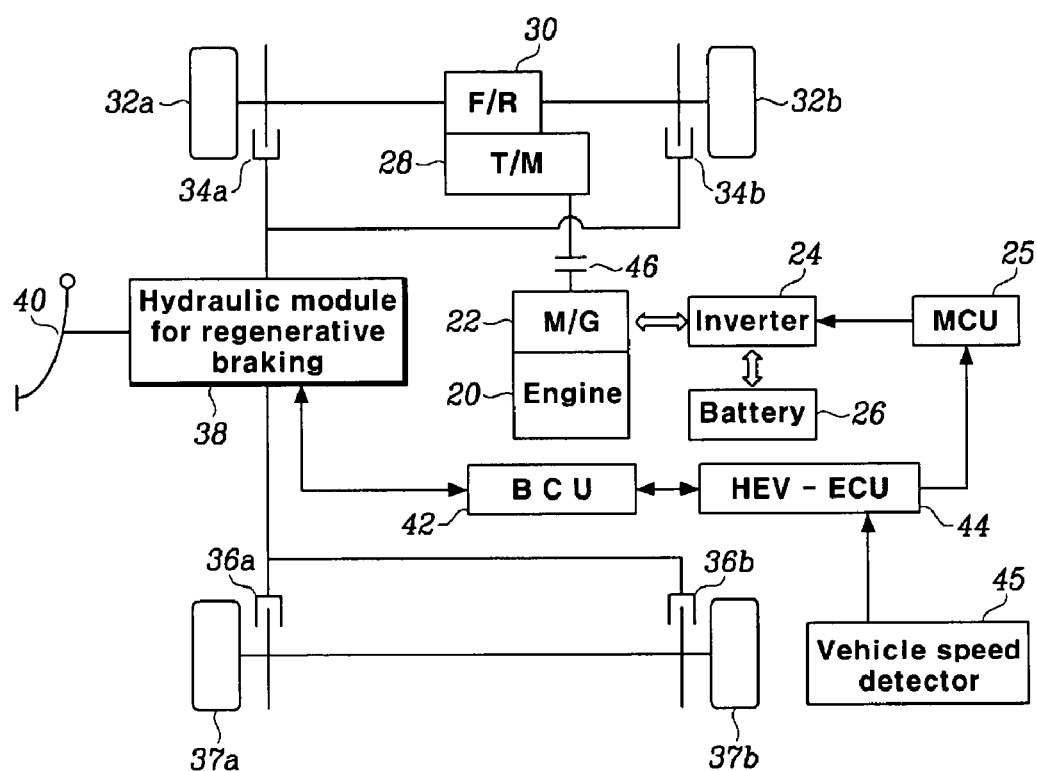
FIG. 1 is a schematic diagram of an electric vehicle according to an embodiment of the present invention.

FIG. 1 is a schematic diagram of an electric vehicle according to an embodiment of the present invention.

The present invention is applicable not only to a hybrid electric vehicle but also to a pure electric vehicle. However, an embodiment in which the spirit of the present invention thereof is applied to a pure electric vehicle is obvious from an embodiment described hereinafter, in which the spirit of the present invention is applied to a hybrid electric vehicle. Therefore, an embodiment in which the spirit of the present invention is applied to a hybrid electric vehicle is hereinafter described in detail.

As shown in FIG. 1, a hybrid electric vehicle according to an embodiment of the present invention includes an engine 20 and a motor/generator unit (hereinafter referred to as M/G unit) 22 as its power source.

In a front-wheel drive vehicle, front wheels are driven by its power source, and in a rear-wheel drive vehicle, rear wheels are driven. Hereinafter, an embodiment of the present invention is described with respect to a front-wheel drive vehicle. The invention can be equally applied to a rear-wheel drive vehicle.

The M/G unit 22 is a device that selectively operates either as a motor or as a generator according to its operational state, as would be clear to a person of ordinary skill in the art. Therefore, hereinafter, the M/G unit 22 is often referred to as a motor 22 or a generator 22 for better comprehension, however, they denotes the same element.

In an electric vehicle according to an embodiment of the present invention, the engine 20 and the motor 22 are connected to a transmission 28 in series. The M/G unit 22 is operated by signals of an inverter 24 under the control of a motor control unit (MCU) 25. Under the control of the MCU 25, the inverter 24 may operate the M/G unit 22 as a power source using an electric energy stored in a battery 26, and may operate the M/G unit 22 as a generator so as to charge the battery 26 with an electric energy generated by the M/G unit 22.

Power of the engine 20 and the M/G unit 22 are transmitted to the transmission 28 through a clutch 46, and subsequently output to front wheels 32a and 32b through a final drive gear 30. Rear wheels 37a and 37b are non-driven wheels that are not driven by the engine 20 and the M/G unit 22.

Wheel brakes 34a, 34b, 36a, and 36b are respectively disposed to front wheels 32a and 32b and rear wheels 37a and 37b, for reducing of rotation speeds of the wheels. To operate the wheel brakes, 34a, 34b, 36a, and 36b, the electric vehicle is equipped with a brake pedal 40 and a hydraulic control system 38 for hydraulically braking the wheel brakes 34a, 34b, 36a, and 36b using hydraulic pressure generated by operating the brake pedal 40.

In some embodiments, the electric vehicle includes a brake control unit (BCU) 42 for controlling the hydraulic control system 38 and for receiving a brake control signal from the hydraulic control system 38.

Under operation of the brake pedal 40 by a driver, the BCU 42 detects a hydraulic pressure formed by the hydraulic control system 38. Based thereon, the BCU 42 calculates: (1) the braking force to be applied to the driven wheels (i.e., front wheels 32a and 32b according to an embodiment of the present invention), (2) Hydraulic braking force realized by a hydraulic pressure, and (3) regenerative braking force realized by regenerative braking. Accordingly, the BCU 42 supplies the calculated hydraulic braking force to the wheel brakes 34a and 34b of the front wheels 32a and 32b by controlling the hydraulic control system 38.

In addition, the electric vehicle further includes a hybrid electric vehicle electronic control unit (HEV-ECU) 44 that communicates with the BCU 42 and the MCU 25, and controls them so as to realize a method for controlling regenerative braking of the electric vehicle according to an embodiment of the present invention.

The regenerative braking force calculated at the BCU 42 is transmitted to the HEV-ECU 44, and, accordingly, the HEV-ECU 44 controls the MCU 25 on the basis of such received regenerative braking force. Therefore, the MCU 25 operates the M/G unit 22 as a generator such that the regenerative braking force instruction from the HEV-ECU 44 may be realized. Any electric energy generated by the M/G unit 22 is then stored in the battery 26.

In some embodiments, the electric vehicle is equipped with a vehicle speed detector 45 for detecting a vehicle speed of the electric vehicle. The HEV-ECU 44 utilizes the vehicle speed detected by the vehicle speed detector 45 as data for controlling the BCU 42 and the MCU 25 based thereon.

Summarizing, braking forces acting on front and rear wheels, the rear wheels 37a and 37b (i.e., non-driven wheel) receive only hydraulic braking according to the brake pedal operation of a driver, and the front wheels 32a and 32b (i.e., driven wheel) receives both a hydraulic braking force and a regenerative braking force.

As was described above, an apparatus for controlling regenerative braking of an electric vehicle according to an embodiment of the present invention is provided with the electronic control units 42, 44, and 25 for realizing regenerative braking function of the electric vehicle. The electronic control units 42, 44, and 25 can be realized by one or more processors _____ a predetermined program. The predetermined program can be programmed to perform each step of a method according to an embodiment of this invention.

Figure 2:
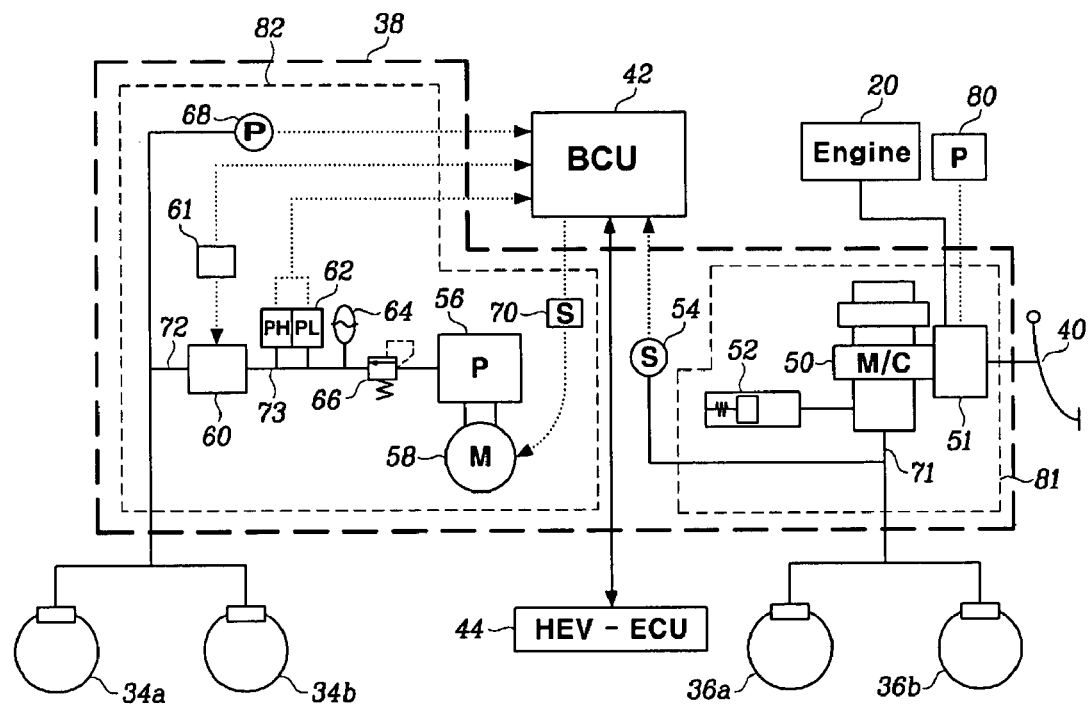
FIG. 2 is a detailed schematic diagram of an apparatus for controlling regenerative braking of an electric vehicle according to an embodiment of the present invention.

FIG. 2 is a detailed schematic diagram of an apparatus for controlling regenerative braking of an electric vehicle according to an embodiment of the present invention. When a driver operates the brake pedal 40, the pressure on the brake pedal 40 is amplified by a lever ratio of the pedal and is applied to a booster (or a hydro-vac.) 51. The pressure on the brake pedal 40 is boosted at the booster 51 and subsequently transmitted to a master cylinder 50. The master cylinder 50 operates a piston (not shown) disposed therein so as to output hydraulic pressure to the brake apparatus 36a and 36b of rear wheels through a first brake pipe 71.

The booster 51 is connected to the engine 20 such that an operational force of the brake pedal 40 of a driver may be boosted using vacuum pressure of the engine 20.

In addition thereto, an embodiment of the present invention further includes a vacuum pump 80 connected to the booster 51 such that a vacuum pressure of the vacuum pump 80 may also be used for boosting of the pedal operational force of the driver. Such a design ensures operation of the booster 51 in the case that an electronic vehicle is run only by the motor 22 with the engine 20 stalled (turned off).

An auxiliary cylinder 52 is connected to the master cylinder 50, for receiving part of the hydraulic pressure formed at the master cylinder 50. Therefore, part of brake fluid output from the master cylinder under a brake pedal operation of the driver is supplied to the brake apparatus 36a and 36b of the rear wheels through the first brake pipe 71, and the rest is received at the auxiliary cylinder 52.

As will be described in more detail below, according to an embodiment of the present invention, hydraulic pressure formed by a separate hydraulic pressure module, i.e., a hydraulic pressure separate from the hydraulic pressure output from the master cylinder 50, is supplied to the brake apparatus 34a and 34b of the front wheels 32a and 32b.

According to a conventional braking system, both the front wheels and rear wheels are supplied with hydraulic pressures from the same master cylinder. Therefore, when only an amount of brake fluid for rear wheels is output from the master cylinder 50 under operation of the brake pedal, a driver may feel an excessive difference in brake pedal response in comparison with a conventional brake system. However, according to an embodiment of the present invention, part of the brake fluid output from the master cylinder 50 is received at the auxiliary cylinder 52, and therefore, a driver may feel substantially the same brake feel as with a conventional vehicle.

A first hydraulic module 81 principally includes hydraulic devices for hydraulically braking the rear wheels (i.e., non-driven wheels).

A first pressure sensor 54 connected to the first brake pipe 71 detects an output hydraulic pressure $P_r$ (i.e., a brake fluid pressure applied to the non-driven wheels) of the master cylinder 50, and transmits it to the BCU 42. The output hydraulic pressure $P_r$ of the master cylinder 50 depends on the operation of the brake pedal by a driver, so a driver's desire for deceleration may be determined based thereon.

In more detail, according to an apparatus for controlling regenerative braking of an electric vehicle according to an embodiment of the present invention, the BCU 42 calculates a braking force $F_{br}$ applied to rear wheels (i.e., non-driven wheels) based on the output pressure $P_r$ of the master cylinder 50 detected by the first pressure sensor 54. The BCU then calculates a target braking force $F_{bf}$ for the front wheels (i.e., driven wheels) corresponding to the braking force $F_{br}$ of the non-driven wheels. Subsequently, the BCU 42 calculates, based on a running status of the electric vehicle, an available regenerative braking force $F_{REGEN}$ that can be realized at the driven wheels, and then performs hydraulic braking of the front wheels on the basis of a comparison of the target braking force $F_{bf}$ and the available regenerative braking force $F_{REGEN}$.

Meanwhile, the BCU 42 calculates a target regenerative braking torque $T_{OP}$ for the front wheels, and transmits it to the HEV-ECU 44. Subsequently, the HEV-ECU 44 controls the M/G unit 22 as a generator by controlling the MCU 25 such that the received target regenerative braking torque $T_{OP}$ may be realized.

Detailed steps that each of the electronic control units 42, 44, and 25 executes for realization of such regenerative braking will be described in a description of a method for controlling regenerative braking of an electric vehicle according to an embodiment of the present invention. Detailed features of the electronic control units 42, 44, and 25 are clear from such descriptions. Hereinafter, a mechanical section of an apparatus for realizing a method for controlling regenerative braking of an electric vehicle is described in further detail.

A second hydraulic module 82 for hydraulic braking of front wheels 32a and 32b (i.e., driven wheel) is formed and operates as follows. The second hydraulic module 82 includes a hydraulic pump 56 for forming hydraulic pressure required for hydraulically braking the front wheels 32a and 32b, an accumulator 64 for storing the hydraulic pressure formed by the hydraulic pump 56, a second brake pipe 72 for supplying the hydraulic pressure stored in the accumulator 64 to the front wheels 32a and 32b, and hydraulic pressure control devices 60 and 61 for controlling supply of the hydraulic pressure stored in the accumulator 64 to the second brake pipe 72.

The hydraulic pump 56 is driven by a pump driving motor 58, and the pump driving motor 58 is controlled by the BCU 42 through a motor switch 70. A relief valve 66 is provided at an output side of the hydraulic pump 56. The hydraulic pressure control device 60 and 61 include a proportional pressure reducing valve 60 and a valve driver 61 for controlling the proportional pressure reducing valve 60. The hydraulic pressure to be supplied to the front wheel brake apparatus (i.e., wheel cylinder) 34a and 34b is supplied through the proportional pressure reducing valve 60. The BCU 42 realizes a target hydraulic pressure for the front wheel brake apparatus 34a and 34b by controlling the proportional pressure reducing valve 60 through driving of the valve driver 61.

A second pressure sensor 68 is provided on the second brake pipe 72, and transmits a hydraulic pressure of the second brake pipe 72 to the BCU 42 such that the BCU 42 may determine whether the target hydraulic pressure is actually supplied to the brake apparatus 34a and 34b of the front wheels (i.e., driven wheels) 32a and 32b through the second brake pipe 72.

The hydraulic pump 56 is preferably operated in an efficient manner, since operation of the hydraulic pump 56 requires power consumption. For that purpose, a pressure switch 62 is provided on a third brake pipe 73 connecting the hydraulic pump 56 and the proportional pressure reducing valve. An output signal of the pressure switch 62 is sent to the BCU 42. The pressure switch 62 turns on when a detected pressure thereof is lowered to a first predetermined pressure $P_L$, and turns off when the detected pressure is raised to a second predetermined pressure $P_H$. The BCU 42 operates the pump driving motor 58 on the basis of such an output signal of the pressure switch 62. That is, the BCU 42 operates the pump driving motor 58 by turning on the motor switch 70 when the pressure switch 62 is turned on, and stops the operation of the pump driving motor 58 by turning off the motor switch 70 when the pressure switch 62 is turned off. Consequently, an operational pattern of the motor switch 70 for the pump driving motor is as shown in FIG. 3.

Figure 3:
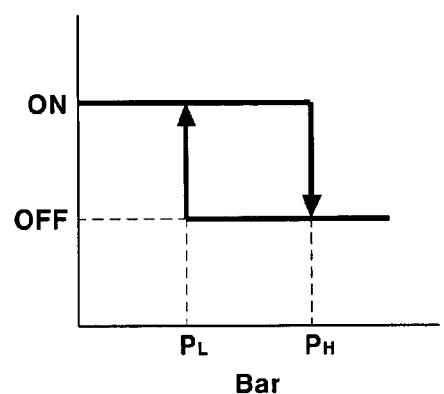
FIG. 3 illustrates an operational pattern for an on/off switch of a hydraulic pump driving motor according to an embodiment of the present invention.

That is, as shown in FIG. 3, the pump driving motor 58 starts its operation when the hydraulic pressure of the accumulator 64 is lowered to the first predetermined pressure $P_L$, and stops its operation when the hydraulic pressure of the accumulator 64 is raised to the second predetermined pressure $P_H$. Therefore, the pressure of the accumulator 64 always remains between the first and second predetermined pressures, and an operational period of the pump driving motor 58 for maintaining the pressure of the accumulator 64 is minimized.

In the above description of an embodiment of the present invention, the pressure switch 62 is introduced to maintain the pressure of the accumulator 64 between the first and second predetermined pressures. However, it should not be understood that the scope of the present invention is limited thereto. As an example of variations thereto, a third pressure sensor may be introduced to replace the pressure switch 62 such that the BCU 42 may operate, on the basis of hysteresis of the pressure of the accumulator 64 detected by the third pressure sensor, the motor switch 70 according to the same operational pattern shown in FIG. 3.

Prior to describing a method for controlling regenerative braking of an electric vehicle according to an embodiment of the present invention, a principle for an ideal braking force distribution for a vehicle having front and real wheels is hereinafter described. Then, a pattern for a braking force distribution used in a present embodiment is described.

When a braking force is improperly distributed to front and rear wheels of a vehicle, a lock-up of a brake may be caused so that excessive slip may occur between a tire and a road. Therefore, in order to achieve sufficient brake performance of a vehicle and to stably control a vehicle behavior, a braking force distribution between front and rear wheels should be appropriately controlled.

Figure 4:
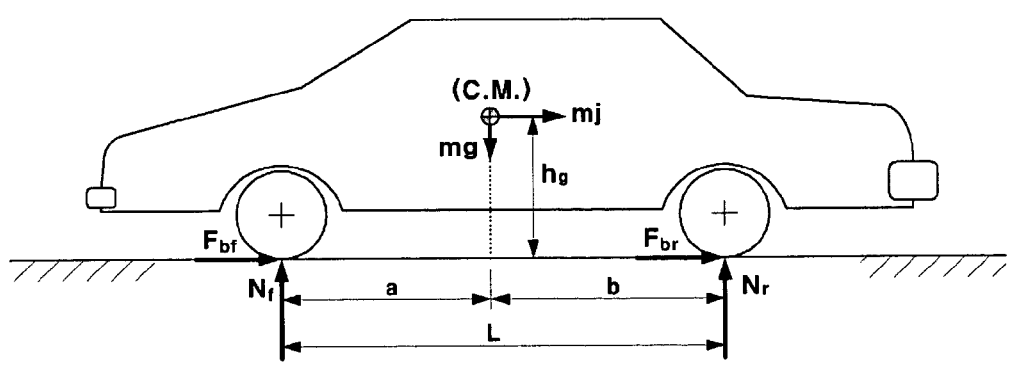
FIG. 4 is a drawing for explaining force relationships of an electric vehicle under braking according to an embodiment of the present invention.

FIG. 4 is a drawing for explaining force relationships of an electric vehicle under braking according to an embodiment of the present invention.

Normal forces acting on front and rear wheels are respectively denoted as $N_f$ and $N_r$, $N_f$ and $N_r$ may be obtained by the following equation 1 using balance relation of moments.

$$N_f = \frac{mg}{L}\left(b + h_g \frac{j}{g}\right) \text{ and } N_r = \frac{mg}{L}\left(a - h_g \frac{j}{g}\right) \quad \text{(equation 1)}$$

Here, m denotes a mass of the vehicle, g denotes gravitational acceleration, j denotes deceleration of the vehicle, L denotes a wheelbase (distance between front and rear wheels), a denotes a distance from a mass center (center of gravity) to the front wheel of the vehicle, b denotes a distance from a mass center to the rear wheel of the vehicle, and $h_g$ denotes a height of the mass center of the vehicle from the ground.

Available maximum braking forces $N_{bf\_MAX}$ and $N_{br\_MAX}$ of front and rear wheels of a vehicle are proportional to $N_f$ and $N_r$, so they satisfy a relation of $$\frac{F_{bf\_MAX}}{F_{br\_Max}} = \frac{N_f}{N_r}.$$

Therefore, it is preferable that braking force of a vehicle is distributed to front and rear braking forces $F_{bf}$ and $F_{br}$ such that a relation of $$\frac{F_{bf}}{F_{br}} = \frac{N_f}{N_r}$$

is satisfied. Such front and rear braking forces $F_{bf}$ and $F_{br}$ may be calculated as in the following equation 2.

$$\frac{F_{bf}}{F_{br}} = \frac{b + h_g\left(\frac{j}{g}\right)}{a - h_g\left(\frac{j}{g}\right)} \quad \text{(equation 2)}$$

Since a total braking force of a vehicle is a sum of braking forces on front and rear wheels, the following equation 3 may be obtained.

$$F_{bf} + F_{br} = mj \quad \text{(equation 3)}$$

Combining the above equations 2 and 3, an equation for an ideal braking force distribution of front and rear wheels may be summarized as the following equation 4.

$$F_{bf} = \frac{a - \frac{2h_g}{mg}F_{br} - \sqrt{a^2 - \frac{4h_g L}{mg}F_{br}}}{\frac{2h_g}{mg}} \quad \text{(equation 4)}$$

Figure 5:
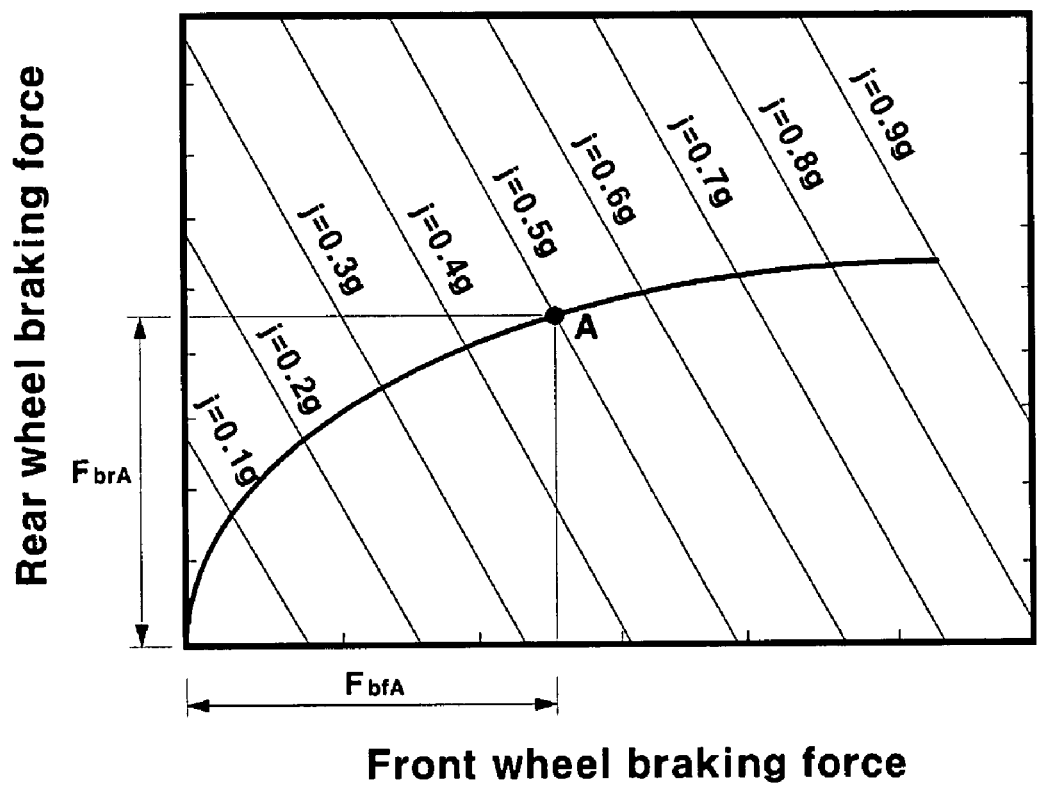
FIG. 5 illustrates a graph of an ideal distribution of front and rear braking forces obtained on the basis of force relations on a behavior of an electric vehicle under braking.

FIG. 5 illustrates a graph of an ideal braking force distribution obtained from the above equation 4.

According to the graph of FIG. 5, given a specific total braking force, ideal front and rear braking forces corresponding thereto may be calculated. Given a specific rear braking force, an ideal front braking force corresponding thereto may be calculated, and vice versa. For example, when a deceleration of the vehicle is required to be 0.5 g, it becomes preferable that braking forces of $F_{bfA}$ and $F_{brA}$ are distributed to front and rear wheels.

According to an embodiment of the present invention, for ideal braking of a vehicle, front and rear braking forces are distributed as shown in FIG. 5 (i.e., according to the above equation 4).

FIG. 5 relies on the premise that none of front and rear wheels experience a lock. When any of the front and rear wheels experiences a lock, braking force distribution of front and rear wheels may be formed differently from as shown in FIG. 5. When a front wheel is locked while a rear wheel is not locked, a braking force $F_{bf}$ for the front wheel may be expressed with respect to a rear braking force $F_{br}$ as the following equation 5.

$$F_{bf} = \frac{\mu h_g}{L - \mu h_g}F_{br} + \frac{\mu mgb}{L - \mu h_g} \quad \text{(equation 5)}$$

Here, μ denotes a maximum static friction coefficient between a road and a tire.

To the contrary, when a rear wheel is locked while a front wheel is not locked, a braking force $F_{br}$ for the rear wheel may be expressed with respect to a front braking force $F_{bf}$ as the following equation 6.

$$F_{br} = -\frac{\mu h_g}{L + \mu h_g}F_{bf} + \frac{\mu mga}{L + \mu h_g} \quad \text{(equation 6)}$$

Figure 6:
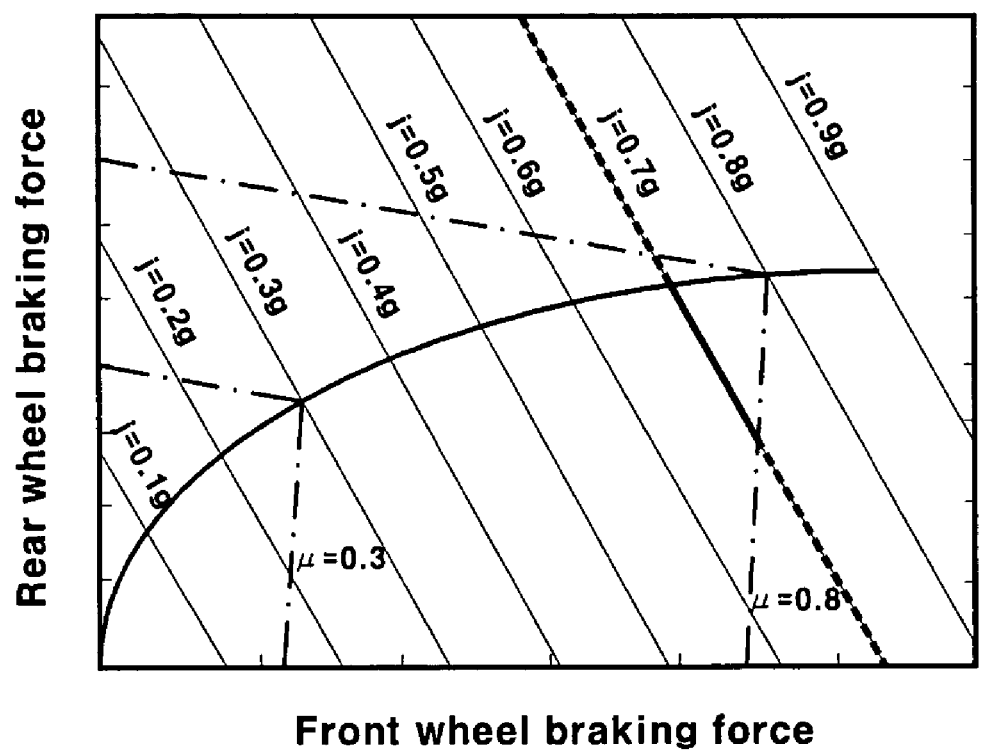
FIG. 6 is a drawing explaining a possible region of braking force distribution, in the case that one of the front and rear wheels is locked under braking.

FIG. 6 is a drawing for explaining a possible region of braking force distribution, in the case that one of the front and rear wheels is locked under braking. The line of ideal braking for distribution shown in FIG. 6 is the same as shown in FIG. 5.

Lines that satisfy the above equations 5 and 6 in the cases of µ=0.3 and µ=0.8 are shown as chain lines in FIG. 6. "µ=0.3" implies that a maximum deceleration of a vehicle is 0.3 g, and "µ=0.8" implies that a maximum deceleration of a vehicle is 0.8 g.

As for a road of µ=0.8, braking force may be distributed to front and rear wheels within a region defined by the chain lines of µ=0.8. Therefore, in this case, when a required braking force of a vehicle is 0.7 g, front and rear braking force distribution may lie only on a region marked as a thick continuous line in FIG. 6. When a braking force distribution is attempted on thick dotted lines in FIG. 6, slip of a vehicle on a road occurs.

According to an embodiment of the present invention, the graph of ideal braking force distribution shown in FIG. 5 is utilized to control braking forces of front and rear wheels, supposing that a continuous slip of a vehicle on a road does not occur due to, e.g., an anti-lock brake system (ABS).

Figure 7:
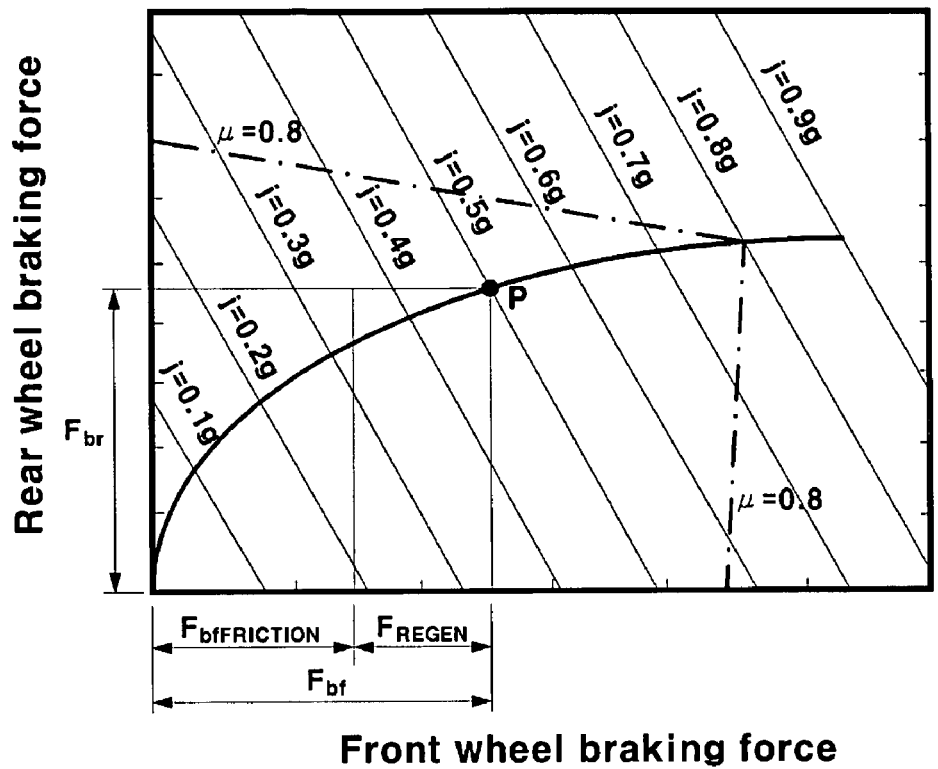
FIG. 7 illustrates a graph of a distribution of front and rear braking forces for an electric vehicle under braking according to an embodiment of the present invention.

FIG. 7 illustrates components of hydraulic braking force and regenerative braking force divided from a total braking force of the front wheels on a graph of ideal front and rear braking forces as in FIG. 5. For example, when a vehicle is required to decelerate at 0.5 g on a road of µ=0.8, front and rear brake force distribution should be on a point P of the ideal braking force distribution line, if the vehicle is to be ideally decelerated. In this case, preferable braking forces respectively required for front wheels 32a and 32b and rear wheels 37a and 37b are obtained as $F_{bf}$ and $F_{br}$.

When a braking force required for the front wheels 32a and 32b is larger than a currently available regenerative braking force $F_{REGEN}$, the available regenerative braking force $F_{REGEN}$ is entirely realized and an insufficient portion $F_{bfFRICTION}=F_{bf}-F_{REGEN}$ of front braking force is realized by hydraulic braking.

When a braking force required for the front wheels 32a and 32b is less than a currently available regenerative braking force $F_{REGEN}$, i.e., when the required front braking force may be realized within the regenerative braking force, the front wheels 32a and 32b are braked only by the regenerative braking force. Therefore in this case, brake cylinders of the front wheels 32a and 32b are not supplied with hydraulic braking force.

Figure 8:
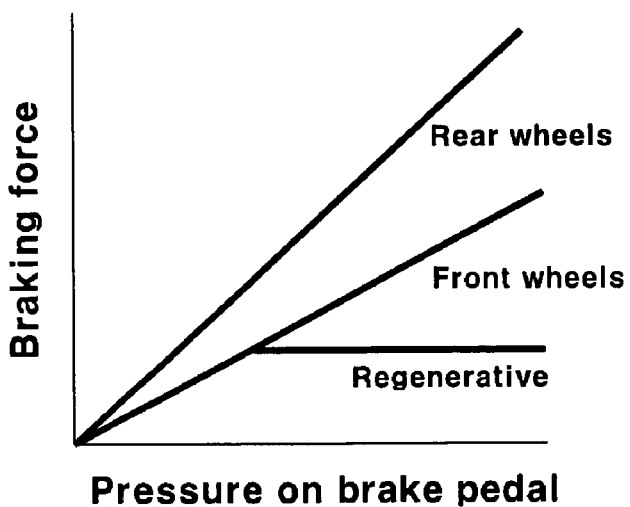
FIG. 8 conceptually illustrates braking status of front and rear wheels of an electric vehicle under braking according to an embodiment of the present invention.

FIG. 8 conceptually illustrates braking of front and rear wheels of an electric vehicle under braking according to an embodiment of the present invention. Hydraulic braking forces on the rear wheels 37a and 37b are formed by, and are proportional to, a force pressing on the brake pedal. When an operating force of a driver on the brake pedal 40 (equivalently, output hydraulic pressure from the master cylinder 50) is small, the front wheels 32a and 32b are braked only by regenerative braking. When an available maximum regenerative braking force does not reach the required total braking force of the front wheels, the regenerative braking force is maximally realized and insufficient front braking force is realized by hydraulic braking.

Prior to describing a method for controlling regenerative braking of an electric vehicle according to an embodiment of the present invention, characteristics of the M/G unit 22 used for an embodiment of the present invention is hereinafter described with reference to FIG. 9.

Figure 9:
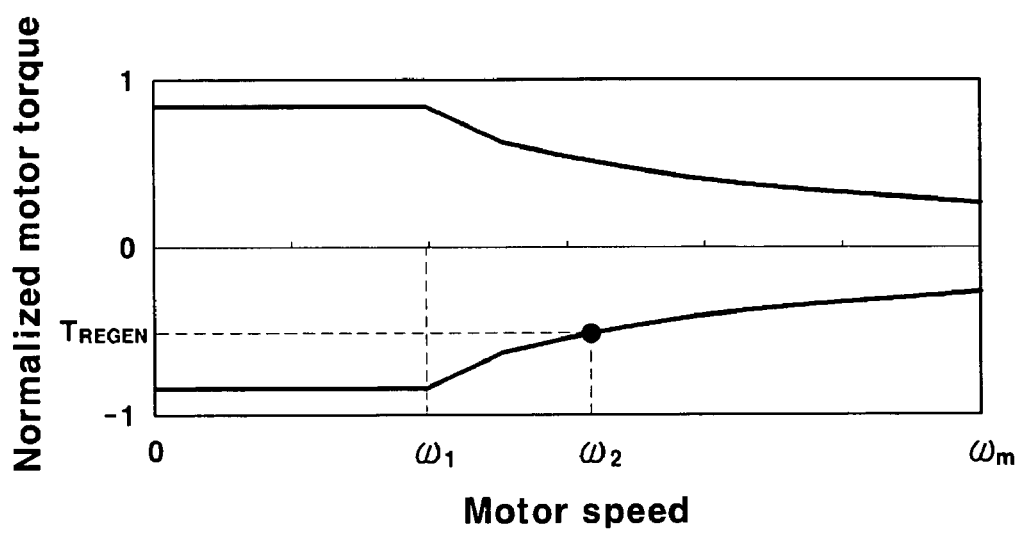
FIG. 9 illustrates an exemplary characteristic curve of a motor-generator unit of an electric vehicle according to an embodiment of the present invention.

FIG. 9 illustrates an exemplary characteristic curve of the M/G unit 22. In FIG. 9, a positive (+) motor torque denotes a torque realized when the M/G unit 22 is driven as a motor, and a negative (−) motor torque denotes a torque required when the M/G unit 22 is driven as a generator. Torque of the M/G unit 22 maintains a maximum torque up to a first rotation speed $\omega_1$, and decreases as a motor speed increases above the first rotation speed $\omega_1$. Under regenerative braking, a torque of the motor as a generator is determined from the motor characteristic curve of FIG. 9, based on the motor speed as shown in FIG. For example, regenerative braking torque at a motor speed $\omega_2$ becomes $T_{REGEN}$.

Figure 10:
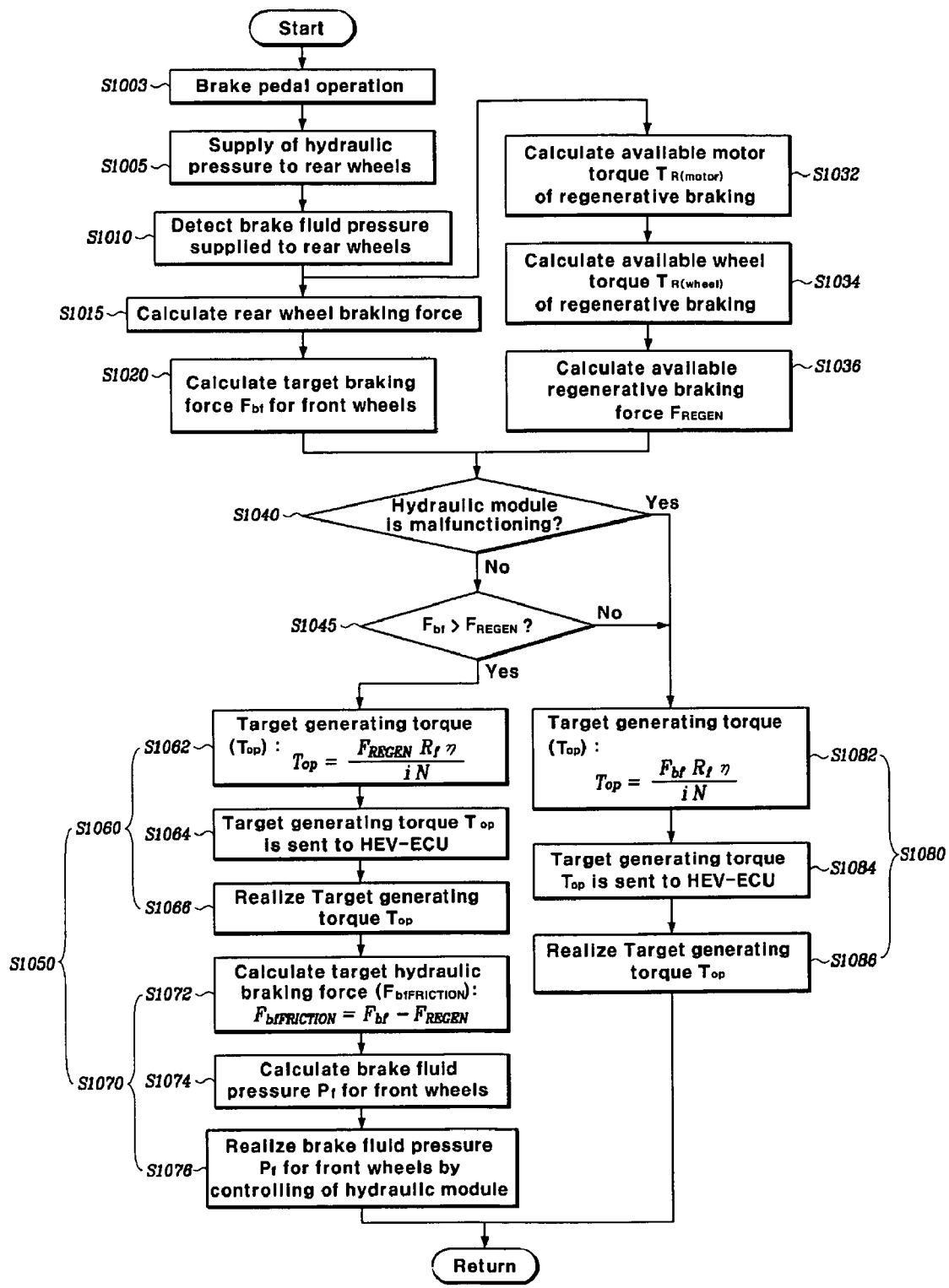
FIG. 10 is a flowchart showing a method for controlling regenerative braking of an electric vehicle according to an embodiment of the present invention.

A method for controlling regenerative braking of an electric vehicle according to an embodiment of the present invention is hereinafter described in detail with reference to FIG. 10. When a driver operates the brake pedal 40 at step S1003, brake fluid pressure $P_r$ corresponding to the pedal operation of the driver is supplied to the rear wheels (i.e., non-driven wheel) 36a and 36b by the first hydraulic module 81, at step S1005. At step S1010, the BCU 42 detects the brake fluid pressure $P_r$ through the first pressure sensor 54. From the detection of the brake fluid pressure $P_r$, the BCU 42 recognizes operation of the brake pedal by the driver.

Subsequently at step S1015, the BCU 42 calculates a braking force $F_{br}$ of the rear wheels (i.e., non-driven wheels) on the basis of the detected brake fluid pressure $P_r$, as a value of the following equation 7.

$$F_{br} = \frac{P_r \times (2r_r A_r \mu_{br})}{R_r} \qquad \text{(equation 7)}$$

Here, $r_r$ denotes an effective radius of a brake disk for the rear wheel, $A_r$ denotes an area of a wheel cylinder for the rear wheel, $\mu_{br}$ denotes a friction coefficient between the brake disk and the wheel cylinder of the rear wheel, and $R_r$ denotes effective radius of a tire on the rear wheel.

In addition, at step S1020, the BCU 42 calculates a target braking force $F_{bf}$ for front wheels (i.e., driven wheel) corresponding to the rear braking force $F_{br}$.

At the step S1020, the target braking force $F_{bf}$ of the front wheels 32a and 32b is calculated as a value that satisfies $$\frac{F_{bf}}{F_{br}} = \frac{N_f}{N_r},$$

and in more detail, as a value that satisfies the following equation 8.

$$F_{bf} = \frac{a - \frac{2h_g}{mg}F_{br} - \sqrt{a^2 - \frac{4h_g L}{mg}F_{br}}}{\frac{2h_g}{mg}} \qquad \text{(equation 8)}$$

Here, $N_f$ denotes a normal force applied to the driven wheel under braking, $N_r$ denotes a normal force applied to the non-driven wheel under braking, m denotes a mass of the vehicle, g denotes gravitational acceleration, j denotes deceleration of the vehicle, L denotes a wheelbase (distance between front and rear wheels), a denotes the distance from the mass center to the front wheel of the vehicle, b denotes the distance from the mass center to the rear wheel of the vehicle, and $h_g$ denotes the height of the mass center of the vehicle from the ground.

In parallel with the calculation of the target braking force $F_{bf}$ for the front wheels 32a and 32b, at step S1036, the BCU 42 calculates an available regenerative braking force $F_{REGEN}$ for the front wheels 32a and 32b. In more detail, at the step S1036 for calculating he available regenerative braking force $F_{REGEN}$, the BCU 42 firstly calculates an available motor torque $T_{R(motor)}$ of regenerative braking at step S1032.

At the step S1032, the available motor torque $T_{R(motor)}$ of regenerative braking is calculated on the basis of a motor speed ω from a characteristic curve of the M/G unit 22. On the basis of a speed ratio i of the current shift-speed and a current vehicle speed v input from the vehicle speed detector 45, the motor speed ω is calculated as a value that satisfies the following equation 9.

$$\omega = \frac{v}{R_f} iN \quad \text{(equation 9)}$$

Here, N denotes a reduction ratio of a final drive gear 30, and $R_f$ denotes an effective radius of a tire on the driven wheel.

After calculating the available motor torque $T_{R(motor)}$ of regenerative braking at step S1032, the BCU 42 calculates an available wheel torque $T_{R(wheel)}$ of regenerative braking at step S1034, on the basis of the available motor torque $T_{R(motor)}$ of regenerative braking.

At step S1034, the available wheel torque $T_{R(wheel)}$ of regenerative braking is calculated as a value that satisfies the following equation 10.

$$T_{R(wheel)} = iN \times \frac{T_{R(motor)}}{\eta} \times W_1(SOC) W_2(v) \quad \text{(equation 10)}$$

Here, i denotes a speed ratio of the current shift-speed, N denotes a final drive ratio of the transmission, η denotes efficiency of the generator 22, $W_1(SOC)$ denotes a first weight factor calculated based on the state of charge (SOC), and $W_2(v)$ denotes a second weight factor calculated based on the current vehicle speed v.

Figure 11:
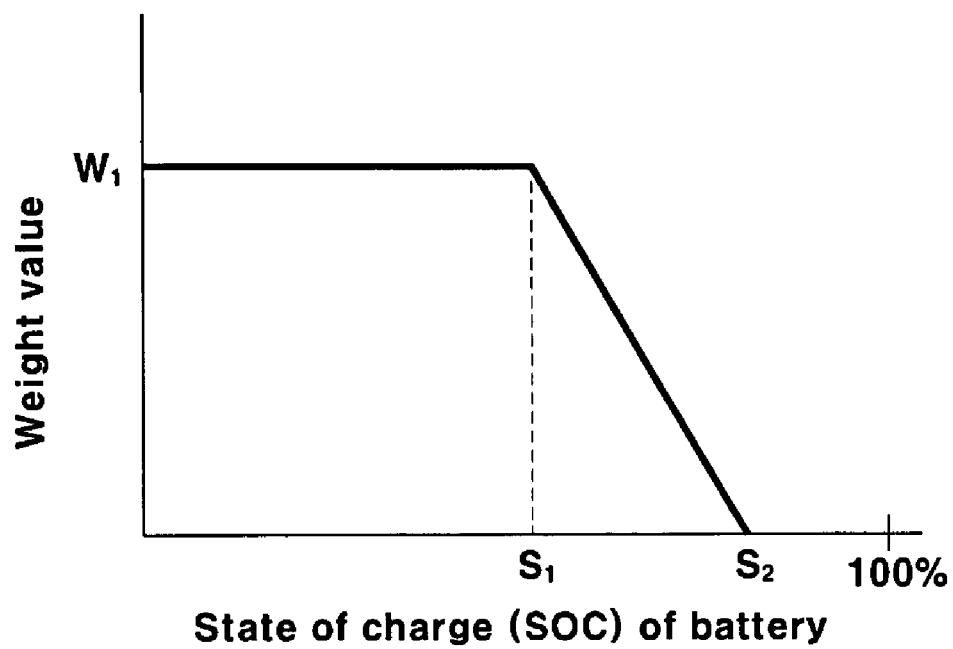
FIG. 11 illustrates an exemplary form of a weight value related to the state of charge, which is used in a method and apparatus for controlling regenerative braking of an electric vehicle according to an embodiment of the present invention.
Figure 12:
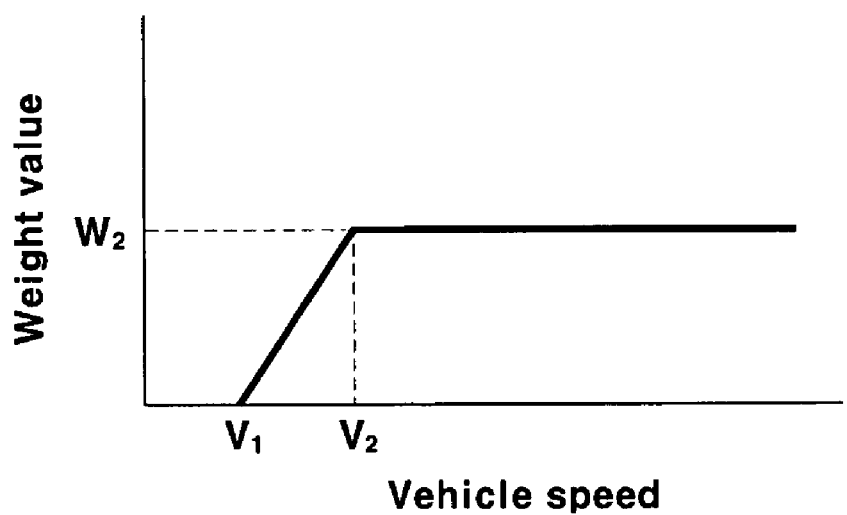
FIG. 12 illustrates an exemplary form of a weight value related to the vehicle speed, which is used in a method and apparatus for controlling regenerative braking of an electric vehicle according to an embodiment of the present invention.

Exemplary values of the first weight factor $W_1$ related to the state of charge (SOC) and the second weight factor $W_2$ related to the vehicle speed v are respectively shown in FIGS. 11 and 12. As shown in FIG. 11, the first weight factor $W_1$ has a first predetermined weight value in the case that the SOC is below a first predetermined SOC $S_1$. In the case that the SOC lies in a range from the first predetermined SOC $S_1$ to a second predetermined SOC $S_2$, the first weight factor $W_1$ has a value that decreases as the SOC increases. In the case that the SOC is above the second predetermined SOC $S_2$, the first weight factor $W_1$ becomes zero (0).

Charging of the battery 26 by regenerative braking while the SOC of the battery 26 is high may deteriorate a lifetime of the battery 26. Therefore, for a protective measure for the battery 26, an amount of regenerative braking is reduced when the SOC is high.

As shown in FIG. 12, in the case that the current vehicle speed v lies in a range from a first predetermined vehicle speed $V_1$ to a second predetermined vehicle speed $V_2$, the second weight factor $W_2$ has a value that increases as the vehicle speed v increases. In the case that the current vehicle speed v is greater than the second predetermined vehicle speed $V_2$, the second weight factor $W_2$ has a second predetermined weight value. When the current vehicle speed v is less than the first predetermined vehicle speed $V_1$, the second weight factor $W_2$ becomes zero (0).

When the vehicle speed v is low (i.e., when the motor speed is low), high regenerative braking force may be achieved due to the characteristic of the motor 22 (refer to FIG. 9). However, when a regenerative braking force is realized at a low vehicle speed, an abrupt increase of total braking force may cause a deterioration of brake feel. Therefore, an amount of regenerative braking is reduced when the vehicle is running a low speed.

After calculating the available wheel torque $T_{R(wheel)}$ of regenerative braking at the step S1034, the BCU 42 calculates the available regenerative braking force $F_{REGEN}$ based thereon at step S1036.

At the step S1036, the available regenerative braking force $F_{REGEN}$ is calculated as a value that satisfies the following equation 11.

$$F_{REGEN} = \frac{T_{R(wheel)}}{R_f} \quad \text{(equation 11)}$$

Here, $R_f$ denotes an effective radius of a tire on the front wheels 32a and 32b.

When the target braking force $F_{bf}$ and the available regenerative braking force $F_{REGEN}$ for the front wheels are calculated, the BCU 42 determines at step S1040 whether the second hydraulic module 82 is malfunctioning. At the step S1040 of determination of a malfunction of the second hydraulic module 82, various malfunction criteria may be set according to a person of ordinary skill in the art. As an example, the criteria may be set as whether either of the pressure switch 62 and the pressure sensor 68 produces abnormal signals or no signals. Steps executed when the second hydraulic module 82 is determined to be malfunctioning are later described in detail.

When the second hydraulic module 82 is not malfunctioning, the BCU 42 compares the target braking force $F_{bf}$ and the available regenerative braking force $F_{REGEN}$ of the front-wheel at step S1045, and subsequently controls regenerative braking and hydraulic braking of the front wheels based on a result of the comparison (S1050 and S1080).

In a method for controlling regenerative braking of an electric vehicle according to an embodiment of the present invention, when the target braking force $F_{bf}$ for the front wheels 32a and 32b is greater than the available regenerative braking force $F_{REGEN}$, the BCU 42 controls the braking of the vehicle such that both of the regenerative braking force $F_{REGEN}$ and hydraulic braking force are applied to the front wheels 32a and 32b (refer to step S1050). In more detail, the available regenerative braking force $F_{REGEN}$ acts on the front wheels 32a and 32b, and an insufficient braking force is realized by hydraulic braking.

For such a control, firstly at step S1060, the BCU 42 regeneratively brakes the front wheels 32a and 32b on the basis of the available regenerative braking force $F_{REGEN}$. Such a regenerative braking operation of the front wheels 32a and 32b may be realized by controlling the M/G unit 22 at a generating torque. A target generating torque $T_{OP}$ for realizing the available regenerative braking force $F_{REGEN}$ at the front wheels 32a and 32b by regenerative braking may be calculated as the following equation 12.

$$T_{OP} = \frac{F_{REGEN} R_f \eta}{iN} \quad \text{(equation 12)}$$

Here, $R_f$ denotes an effective radius of a tire on the driven wheels, $\eta$ denotes efficiency of the generator, i denotes a speed ratio of the current shift-speed, and N denotes a final drive ratio of the transmission.

Referring to the above equations 10, 11, and 12, when the target braking force $F_{bf}$ for the front wheels 32a and 32b is greater than the available regenerative braking force $F_{REGEN}$, the target generating torque $T_{OP}$ for the M/G unit 22 is calculated as a value of $T_{R(motor)}W_1(SOC)W_2(v)$. That is, the M/G unit 22 is driven as a generator at a generating torque obtained by multiplying the available motor torque $T_{R(motor)}$ of regenerative braking with weight values $W_1$ and $W_2$.

Therefore, for regenerative braking of the front wheels at the step S1060, the BCU 42 calculates the target generating torque $T_{OP}$ as a value obtained by the equation 12 at step S1062, and sends the calculated target generating torque $T_{OP}$ to the HEV-ECU 44 at step S1064. Then at step S1066, the HEV-ECU 44 controls the M/G unit 22 through the MCU 25 such that the received target generating torque $T_{OP}$ may be realized.

While regeneratively braking the front wheels 32a and 32b, at step S1070, the BCU 42 realizes braking force uncovered by the regenerative braking force ($F_{REGEN}$), by hydraulic braking, to reach the required front braking force.

For that purpose, firstly at step S1072, the BCU 42 calculates a target hydraulic braking force $F_{bfFRICTION}$ to be applied to the front wheels 32a and 32b. The target hydraulic braking force($F_{bfFRICTION}$) for the front wheels is calculated according to the following equation 13.

$$F_{bfFRICTION} = F_{bf} - F_{REGEN} \quad \text{(equation 13)}$$

That is, the target hydraulic braking force $F_{bfFRICTION}$ to be applied to the front wheels 32a and 32b is calculated as a difference between the target braking force $F_{bf}$ and the available regenerative braking force $F_{REGEN}$.

After calculating the target hydraulic braking force $F_{bfFRICTION}$, at step S1074, the BCU 42 calculates a brake fluid pressure $P_f$ to be applied to the wheel brake apparatus 34a and 34b of the front wheels 32a and 32b for achievement of the target hydraulic braking force $F_{bfFRICTION}$.

The brake fluid pressure $P_f$ for the front wheels is calculated according to the following equation 14.

$$P_f = \frac{R_f F_{bfFRICTION}}{2 r_f A_f \mu_{bf}} \quad \text{(equation 14)}$$

Here, $R_f$ denotes an effective radius of a front tire, $F_{bfFRICTION}$ denotes the target hydraulic braking force, $r_f$ denotes an effective radius of brake disks of front wheels, $A_f$ denotes an area of a front brake wheel cylinder, and $\mu_{bf}$ denotes a friction coefficient between the brake disk and the wheel cylinder of the front wheels.

Therefore at step S1076, the BCU 42 controls the proportional pressure reducing valve 60 through the valve driver 61 on the basis of the brake fluid pressure $P_f$ for the front wheels. Accordingly, the brake fluid pressure $P_f$ for the front wheels is supplied through the brake pipe 72 for the front wheels 32a and 32b.

As described above, when the target braking force ($F_{bf}$) of the front wheels 32a and 32b is greater than the available regenerative braking force $F_{REGEN}$, the available regenerative braking force $F_{REGEN}$ is entirely realized and the hydraulic braking force $F_{bfFRICTION}$ is added thereto for an achievement of a required ideal braking force.

When the target braking force $F_{bf}$ of the front wheels 32a and 32b is less than the available regenerative braking force $F_{REGEN}$ at the step S1045, the front wheels 32a and 32b are braked only by a regenerative braking force at step S1080. That is, the M/G unit 22 is controlled at a target generating torque $T_{OP}$ corresponding to the target braking force $F_{bf}$ for the front wheels. The target generating torque $T_{OP}$ corresponding to the target braking force $F_{bf}$ may be calculated as in the following equation 15.

$$T_{OP} = \frac{F_{bf} R_f \eta}{iN} \quad \text{(equation 15)}$$

Therefore, the BCU 42 calculates the target generating torque $T_{OP}$ as a value obtained by the equation 15 at step S1082, and sends the calculated target generating torque $T_{OP}$ to the HEV-ECU 44 at step S1084. Then at step S1086, the HEV-ECU 44 controls the M/G unit 22 through the MCU 25 such that the received target generating torque $T_{OP}$ may be realized.

In the above description, regenerative braking is described in connection with the case that the second hydraulic module 82 for a hydraulic braking of the front wheels 32a and 32b is not malfunctioning.

As described above, after calculating the target braking force $F_{bf}$ and the available regenerative braking force $F_{REGEN}$ for the front wheels, the BCU 42 determines at the step S1040 whether the second hydraulic module 82 is malfunctioning.

When the second hydraulic module 82 is determined to be malfunctioning at the step S1040, the step S1080 is executed such that the front wheels 32a and 32b are braked only by a regenerative braking force, the same as in the case that the target braking force $F_{bf}$ of the front wheels 32a and 32b is less than the available regenerative braking force $F_{REGEN}$.

Therefore, even in the case that the second hydraulic module 82 is malfunctioning, at least the braking function of the front wheels 32a and 32b by regenerative braking thereof is fully utilized.

According to an embodiment of the present invention, non-driven wheels are under hydraulic braking by a brake operation of a driver, and driven wheels are under regenerative braking taking into account an amount of hydraulic braking of the non-driven wheels and a running state of a motor. Therefore, regenerative braking of the driven wheels becomes most efficient. In addition, a total braking force of a vehicle may resultantly become proportional to the brake pedal operation of the driver, and therefore, drivability of the vehicle is enhanced.

The amount of hydraulic braking of the non-driven wheel is determined based on a brake fluid pressure directly detected from a hydraulic route to the non-driven wheels, and therefore, accuracy is always ensured. In particular, referring to data of several vehicle specifications, the braking force of the non-driven wheels is easily calculated on the basis of the brake fluid pressure of the non-driven wheel.

A target braking force to be applied to driven wheels in correspondence to the braking force of the non-driven wheel is calculated according to an ideal braking force distribution that is based on an analysis of vehicle dynamics. Therefore, the vehicle may always maintain its ideal braking behavior in response to a driver's brake operation.

A required braking force for a driven wheel is compared with an available regenerative braking force thereof, and an amount of regenerative braking thereof is controlled based on the comparison. Therefore, utilization of regenerative braking is maximized.

The available regenerative braking force is efficiently calculated by equations described above.

In particular, a weight factor relating to a state of charge SOC and/or a current vehicle speed is introduced to calculate an available regenerative braking force. Therefore, an amount of regenerative braking may be appropriately controlled taking into account a running state of an electric vehicle.

When a required braking force for a driven wheel is less than an available regenerative braking force, driven wheels are braked only by regenerative braking, and therefore, an effect of regenerative braking, i.e., energy reclamation efficiency, becomes maximized.

When a required braking force for a driven wheel is greater than an available regenerative braking force, efficiency of energy consumption of an electric vehicle is maximized, since the available regenerative braking force is entirely utilized and hydraulic braking only supplements an insufficient braking force.

According to an embodiment of the present invention, regenerative braking is ensured even when a hydraulic pressure module for hydraulic braking of driven wheels is malfunctioning.

Therefore, against a malfunctioning of such a hydraulic pressure module, a required braking force may be realized by regenerative braking if the required braking force for a driven wheel is not excessively high.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling regenerative braking of an electric vehicle having a motor, the method comprising:
    detecting a brake pedal operation;
    calculating a non-driven wheel braking force applied to a non-driven wheel of the electric vehicle according to the brake pedal operation;
    calculating a target braking force for a driven wheel corresponding to the non-driven wheel braking force;
    calculating an available regenerative braking force for the driven wheel;
    comparing the target braking force and the available regenerative braking force for the driven wheel; and
    controlling regenerative braking and hydraulic braking of the driven wheel based on the the comparison of the target braking force and the available regenerative braking force for the driven wheel.

2. The method of claim 1, wherein the calculating of the non-driven wheel braking force comprises:
    detecting a brake fluid pressure Pr applied to the non-driven wheel by the brake pedal operation; and
    calculating the non-driven wheel braking force Fbr on the basis of the brake fluid pressure Pr.

3. The method of claim 2, wherein the non-driven wheel braking force Fbr is calculated on the basis of the brake fluid pressure Pr as a value of $$F_{br} = \frac{P_r \times (2 r_r A_r \mu_{br})}{R_r},$$

wherein rr denotes an effective radius of a brake disk for the non-driven wheel, Ar denotes an area of a wheel cylinder for the non-driven wheel, μbr denotes a friction coefficient between the brake disk and the wheel cylinder of the non-driven wheel, and Rr denotes an effective radius of a tire on the non-driven wheel.

4. The method of claim 1, wherein the target braking force for the driven wheel is calculated as a value Fbf that satisfies $$\frac{F_{bf}}{F_{br}} = \frac{N_f}{N_r},$$

wherein Fbf denotes the target braking force for the driven wheel, Fbr denotes the non-driven wheel braking force, Nf denotes normal force applied to the driven wheel under braking, and Nr denotes a normal force applied to the non-driven wheel under braking.

5. The method of claim 4, wherein the target braking force for the driven wheel is calculated as a value Fbf that satisfies $$F_{bf} = \frac{a - \frac{2h_g}{mg} F_{br} - \sqrt{a^2 - \frac{4h_g L}{mg} F_{br}}}{\frac{2h_g}{mg}},$$

wherein Fbr denotes the non-driven wheel braking force, m denotes a mass of the vehicle, g denotes gravitational acceleration, j denotes deceleration of the vehicle, L denotes a wheelbase (distance between front and rear wheels), a denotes a distance from a mass center to the front wheel of the vehicle, b denotes a distance from a mass center to the rear wheel of the vehicle, and hg denotes a height of the mass center of the vehicle from the ground.

6. The method of claim 1, wherein the calculating of the available regenerative braking force for the driven wheel comprises:
    calculating an available maximum regenerative braking torque;
    calculating an available wheel torque of regenerative braking on the basis of the available maximum regenerative braking torque; and
    calculating the available regenerative braking force for the driven wheel on the basis of the available wheel torque of regenerative braking.

7. The method of claim 6, wherein the calculating of the available maximum regenerative braking torque calculates the available maximum regenerative braking torque on the basis of a motor speed ω corresponding to a current vehicle speed of the electric vehicle from a torque characteristic curve of the motor with respect to the motor speed ω.

8. The method of claim 7, wherein the motor speed ω is calculated as a value $$\omega = \frac{v}{R_f} iN,$$

wherein v denotes the current vehicle speed of the electric vehicle, i denotes a speed ratio of the current shift-speed, N denotes a reduction ratio of a final drive gear, and Rf denotes an effective radius of a tire on the driven wheel.

9. The method of claim 6, wherein the calculating of the available wheel torque of regenerative braking calculates the available wheel torque of regenerative braking as a value TR(wheel) that satisfies $$T_{R(wheel)} = iN \times \frac{T_{R(motor)}}{\eta} \times W,$$

wherein i denotes a speed ratio of the current shift-speed, N denotes a final drive ratio of the transmission, TR(motor) denotes the available motor torque of regenerative braking, η denotes efficiency of the generator, and W denotes a weight value calculated based on at least one parameter of a state of charge (SOC) and the current vehicle speed.

10. The method of claim 9, wherein the weight value W is calculated, based on both the state of charge and the current vehicle speed, as a value W=W1 (SOC)*W2(v),
wherein W1(SOC) denotes a first weight factor calculated based on the state of charge SOC, and W2(v) denotes a second weight factor calculated based on the current vehicle speed v.

11. The method of claim 10, wherein:
in the case that the state of charge SOC is below a first predetermined SOC, the first weight factor W1(SOC) has a first predetermined weight value; and
in the case that the state of charge SOC lies in a range from the first predetermined SOC to a second predetermined SOC, the first weight factor has a value that decreases as the SOC increases.

12. The method of claim 10, wherein:
in the case that the current vehicle speed v lies in a range from a first predetermined vehicle speed to a second predetermined vehicle speed, the second weight factor (W2(v)) has a value that increases as the vehicle speed v increases; and
in the case that the current vehicle speed v is greater than the second predetermined vehicle speed, the second weight factor (W2(v)) has a second predetermined weight value.

13. The method of claim 1, wherein the controlling of regenerative braking and hydraulic braking of the driven wheel comprises braking the driven wheel only by regenerative braking in the case that the available regenerative braking force is greater than the target braking force.

14. The method of claim 13, wherein the braking of the driven wheel only by regenerative braking controls a generator of the electric vehicle at a generating torque that forms the target braking force.

15. The method of claim 13, wherein the braking of the driven wheel only by regenerative braking controls a generator of the electric vehicle at an electricity generating torque TOP that is calculated as a value of $$T_{OP} = \frac{F_{bf} R_f \eta}{iN},$$

wherein Fbf denotes the target braking force for the driven wheel, Rf denotes an effective radius of a tire on the driven wheel, η denotes efficiency of the generator, i denotes a speed ratio of the current shift-speed, and N denotes a final drive ratio of the transmission.

16. The method of claim 1, wherein the controlling of regenerative braking and hydraulic braking of the driven wheel comprises, in the case that the target braking force is greater than the available regenerative braking force:
regeneratively braking the driven wheel on the basis of the available regenerative braking force;
calculating a target hydraulic braking force; and
hydraulically braking the driven wheel on the basis of the target hydraulic braking force.

17. The method of claim 16, wherein the regeneratively braking of the driven wheel on the basis of the available regenerative braking force controls a generator of the electric vehicle at an electricity generating torque that is calculated as a value of $$T_{OP} = \frac{F_{REGEN} R_f \eta}{iN},$$

wherein FREGEN denotes the available regenerative braking force for the driven wheel, Rf denotes an effective radius of a tire on the driven wheel, η denotes efficiency of the generator, i denotes a speed ratio of the current shift-speed, and N denotes a final drive ratio of the transmission.

18. The method of claim 16, wherein the calculating of the target hydraulic braking force calculates the target hydraulic braking force as a difference between the target braking force and the available regenerative braking force.

19. The method of claim 16, wherein the hydraulically braking of the driven wheel on the basis of the target hydraulic braking force hydraulically brakes the driven wheel on the basis of a brake fluid pressure Pf that is calculated as a value of $$P_f = \frac{R_f F_{bfFRICTION}}{2 r_f A_f \mu_{bf}},$$

wherein Rf denotes an effective radius of a tire on the driven wheel, FbfFRICTION denotes the target hydraulic braking force, rf denotes an effective radius of a brake disk for the driven wheel, Af denotes an area of a wheel cylinder for the driven wheel, and μbf denotes a friction coefficient between the brake disk and the wheel cylinder of the driven wheel.

20. A apparatus for controlling regenerative braking of an electric vehicle, the electric vehicle comprising a battery for storing electric energy, a motor for generating driving force from the electric energy of the battery, at least one driven wheel driven by the motor, and at least one non-driven wheel that is not driven by the motor, the apparatus comprising:
a brake pedal;
a first hydraulic module for hydraulically braking the non-driven wheel in response to a brake pedal operation;
at least one electronic control unit (ECU) for detecting operation of the first hydraulic module and for controlling regenerative braking and hydraulic braking of the driven wheel based thereon; and a second hydraulic module for executing hydraulic braking of the driven wheel under the control of the at least one ECU.

21. The apparatus of claim 20, wherein the first hydraulic module comprises:
   a master cylinder for forming hydraulic pressure in response to the brake pedal operation;
   a brake pipe for supplying the hydraulic pressure of the master cylinder to the non-driven wheel; and
   an auxiliary cylinder connected to at least one of the master cylinder and the brake pipe, for receiving at least part of the hydraulic pressure formed by the master cylinder.

22. The apparatus of claim 20, wherein the second hydraulic module comprises:
   a hydraulic pump for forming a hydraulic pressure under the control of the at least one ECU;
   an accumulator for storing the hydraulic pressure formed by the hydraulic pump;
   a brake pipe for supplying the hydraulic pressure stored in the accumulator to the driven wheel; and
   a hydraulic pressure control device for controlling, under the control of the at least one ECU, supply of the hydraulic pressure stored in the accumulator to the brake pipe.

23. The apparatus of claim 22, wherein the at least one ECU executes a set of instructions comprising instructions for:
   detecting the hydraulic pressure of the accumulator; and
   controlling the hydraulic pump such that the hydraulic pressure of the accumulator stays within a predetermined range.

24. The apparatus of claim 23, wherein the controlling of the hydraulic pump operates the hydraulic pump in the case that the hydraulic pressure of the accumulator is lowered to a first predetermined pressure, and stops an operation of the hydraulic pump in the case that the hydraulic pressure of the accumulator is raised to a second predetermined pressure.

25. The apparatus of claim 20, wherein the at least one ECU executes a set of instructions comprising instructions for:
   detecting a brake pedal operation;
   calculating a non-driven wheel braking force applied to a non-driven wheel of the electric vehicle according to the brake pedal operation;
   calculating a target braking force for a driven wheel corresponding to the non-driven wheel braking force;
   calculating an available regenerative braking force for the driven wheel;
   comparing the target braking force and the available regenerative braking force for the driven wheel; and
   controlling regenerative braking and hydraulic braking of the driven wheel on the basis of the comparison of the target braking force and the available regenerative braking force for the driven wheel.

26. The apparatus of claim 25, wherein the calculating of the non-driven wheel braking force comprises:
   detecting a brake fluid pressure Pr applied to the non-driven wheel by the brake pedal operation; and
   calculating the non-driven wheel braking force Fbr on the basis of the brake fluid pressure Pr.

27. The apparatus of claim 25, wherein the target braking force for the driven wheel is calculated as a value Fbf that satisfies $$\frac{F_{bf}}{F_{br}} = \frac{N_f}{N_r},$$

wherein Fbf denotes the target braking force for the driven wheel, Fbr denotes the non-driven wheel braking force, Nf denotes normal force applied to the driven wheel under braking, and Nr denotes a normal force applied to the non-driven wheel under braking.

28. The apparatus of claim 25, wherein the calculating of the available regenerative braking force for the driven wheel comprises:
   calculating an available maximum regenerative braking torque;
   calculating an available wheel torque of regenerative braking on the basis of the available maximum regenerative braking torque; and
   calculating the available regenerative braking force for the driven wheel on the basis of the available wheel torque of regenerative braking.

29. The apparatus of claim 28, wherein the calculating of the available maximum regenerative braking torque calculates the available maximum regenerative braking torque on the basis of a motor speed ω corresponding to a current vehicle speed of the electric vehicle from a torque characteristic curve of the motor with respect to the motor speed ω.

30. The apparatus of claim 28, wherein the calculating of the available wheel torque of regenerative braking calculates the available wheel torque of regenerative braking as a value TR(wheel) that satisfies $$T_{R(wheel)} = iN \times \frac{T_{R(motor)}}{\eta} \times W,$$

wherein i denotes a speed ratio of the current shift-speed, N denotes a final drive ratio of the transmission, TR(motor) denotes the available motor torque of regenerative braking, η denotes efficiency of the generator, and W denotes a weight value calculated based on at least one parameter of a state of charge (SOC) and the current vehicle speed.

31. The apparatus of claim 30, wherein the weight value W is calculated, based on both the state of charge and the current vehicle speed, as a value W=W1(SOC)*W2(v),
   wherein W1(SOC) denotes a first weight factor calculated based on the state of charge SOC, and W2(v) denotes a second weight factor calculated based on the current vehicle speed v.

32. The apparatus of claim 25, wherein the controlling of regenerative braking and hydraulic braking of the driven wheel comprises braking the driven wheel only by regenerative braking in the case that the available regenerative braking force is greater than the target braking force.

33. The apparatus of claim 25, wherein the controlling of regenerative braking and hydraulic braking of the driven wheel comprises, in the case that the target braking force is greater than the available regenerative braking force:
   regeneratively braking the driven wheel on the basis of the available regenerative braking force;
   calculating a target hydraulic braking force; and
   hydraulically braking the driven wheel on the basis of the target hydraulic braking force.

34. The apparatus of claim 33, wherein the calculating of the target hydraulic braking force calculates the target hydraulic braking force as a difference between the target braking force and the available regenerative braking force.

* * * * *